United States Patent [19]

Stenkvist

[11] 4,034,146

[45] July 5, 1977

[54] METHOD AND APPARATUS FOR EQUALIZING THE WALL LINING WEAR IN THREE PHASE ALTERNATING CURRENT ELECTRIC ARC FURNACES

[76] Inventor: Sven-Einar Stenkvist, Ormbergssvangen 10, 724 62 Vasteras, Sweden

[22] Filed: Jan. 27, 1976

[21] Appl. No.: 652,660

[30] Foreign Application Priority Data

Jan. 28, 1975 Sweden .............................. 7500812

[52] U.S. Cl. .................................................. 13/11
[51] Int. Cl.² ........................................ H05B 7/20
[58] Field of Search .................... 13/1, 4, 9, 11, 35; 219/123

[56] References Cited

UNITED STATES PATENTS

| 3,409,726 | 11/1968 | Matsumoto et al. ................... 13/11 |
| R24,463 | 4/1958 | Williamson .......................... 13/4 X |

FOREIGN PATENTS OR APPLICATIONS 252,037 5/1926 United Kingdom .................... 13/4

Primary Examiner—R. N. Envall, Jr.
Attorney, Agent, or Firm—Fleit & Jacobson

[57] ABSTRACT

Method and apparatus for increasing the life of the lining of a three phase AC electric arc furnace. An electro-magnetic coil, mounted under the furnace and powered by DC or low frequency AC sets up a magnetic field inside the furnace, intersecting the arcs. During consecutive half cycles of the alternating arc current, the arcs are then steered away, alternating between new positions on both sides of the usual hot spot areas on the furnace wall.

11 Claims, 8 Drawing Figures

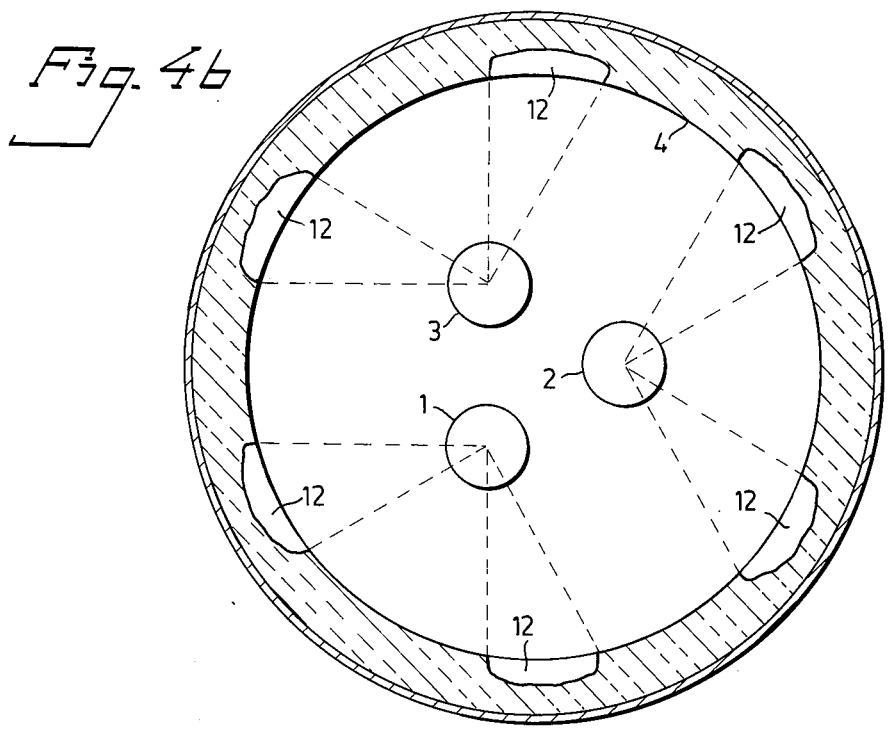
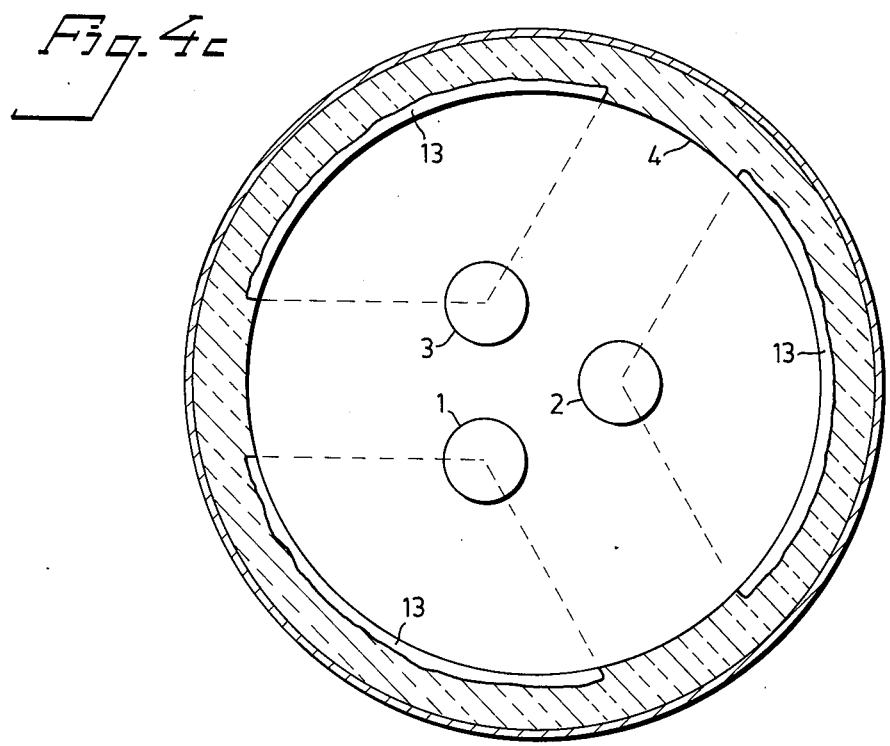

METHOD AND APPARATUS FOR EQUALIZING THE WALL LINING WEAR IN THREE PHASE ALTERNATING CURRENT ELECTRIC ARC FURNACES

The present invention relates to a method and an apparatus for equalizing the wear of the wall lining in three-phase AC electric arc furnaces.

In three-phase AC electric arc furnaces the arcs burn from three electrodes to the charge comprising e.g. steel scrap or a liquid bath of molten steel or iron. The electrodes normally comprise graphite or Soderberg electrodes and are usually symmetrically delta arranged, each electrode being connected to its respective one of the phases of a three-phase AC power supply. The arcs do not burn vertically but flare outwardly from the electrodes towards rather limited areas of the furnace wall. These areas are generally known as the hot spot areas of the furnace.

The reason for the arc flare is that each of the arcs is influenced by a magnetic field caused by the currents in the other two electrodes. In a three-phase AC power supply system this field can be described by a field vector at each electrode, the size of the field vector being constant but the direction of which changes in such a way that it rotates one complete turn, i.e. 360°, during each complete cycle of the alternating supply current. The phase relation is such that each time the electrode current goes through zero, the field vector points alternatingly towards the center of the furnace and radially out towards the furnace wall.

The rotating magnetic field interacts with the arc current so that the arc is subjected to a force which as derivable from Biot-Savar's law is the vectorial product of the arc current and the magnetic flux density. Thus, during one half cycle, 0°–180°, each arc is forced to move substantially along a closed path which is located eccentrically towards the adjacent furnace wall in relationship to the center axis of the electrode. At the instant when the arc current reaches its maximum value, the arc is flared radially out towards the furnace wall. During the subsequent half cycle, 180°–360°, the magnetic field vector as well as the arc current have the reversed direction. Thus, the same movement of the arc will be repeated during both positive and negative half cycles of the arc current.

The behavior of the arcs described above means that heat radiation as well as hot gases and e.g. splashes of slag and molten steel stirred up by each arc will be directed with maximum force towards areas of the furnace wall adjacent each electrode and thus the wall wear will be particularly severe in these areas, i.e. the hot spot areas.

Through U.S. Pat. No. 3,406,241 it has previously been suggested to provide a three-phase AC electric arc furnace having three movable magnetic probes which are introduced into the furnace above the melt surface in front of each electrode and serve the object of repelling the arcs from the regions of the furnace wall adjacent the electrodes. These probes are supplied with alternating current which is out of phase with but of the same frequency as the arc current. However, a number of difficulties and disadvantages are inherent in such an arrangement:

The probes are subjected to a very high heat load inside the furnace. This leads to power losses from the furnace as well as difficulties in maintaining the ceramic protective cover on the probes.

The probes must be withdrawn from the furnace during charging and during the early part of the melt down process. Power devices to manipulate the probes would thus be required. Furthermore, the manipulation in and out of the hot furnace will subject the probes to severe heat stresses which would further accentuate the maintenance problems.

The furnace wall lining would be complicated and weakened by the ports or openings necessary to admit the probes.

The probes and their associated manipulating devices would interfere with the working area around the furnace.

According to the U.S. Pat. No. 3,406,241 the probes are energized by an alternating current of the same frequency as the arc current. Thus, each arc is moved to one side of its respective normal hot spot area during one half cycle of the arc current and during the subsequent half cycle to the same side, since both the arc current and the current energizing the probes have then changed direction.

The object of the present invention is to provide an improved method and apparatus for equalizing and substantially evenly distributing the wear on the furnace wall lining caused by the arcs in three-phase AC electric arc furnaces so as to obtain a low lining cost per ton of material treated, e.g. per ton produced steel, and whereby the above mentioned disadvantages are at least substantially eliminated.

In accordance with the invention there is provided a method of equalizing the wear of the wall lining in a three-phase AC electric arc furnace by using a magnetic field arranged substantially symmetrically to the electrodes and intersecting the arcs in the furnace space above the charge, the method comprising passing said magnetic field to the furnace space through the furnace bottom lining and the furnace charge, and maintaining the polarity of the magnetic field unchanged during a period of time substantially exceeding the time period of one complete cycle of the electrode supply current thereby deflecting the arcs alternatingly towards both sides of the arc directions resulting solely from the magnetic fields created by the current passing through the electrodes.

The polarity of the magnetic field intersecting the arcs may either be kept constant or reversed periodically with a frequency less than half the frequency of the electrode supply current. Also, the strength of the magnetic field intersecting the arcs may be varied.

The apparatus according to the invention for equalizing the wear of the wall lining in a three-phase AC electric arc furnace includes means for creating a magnetic field arranged substantially symmetrically to the electrodes and intersecting the arcs in the furnace space above the charge, and the apparatus further comprises at least one electromagnetic coil mounted under the furnace bottom lining and means for supplying an electric current to said coil of a polarity which is unchanged during a period of time substantially exceeding the time period of one complete cycle of the electrode supply current.

In the accompanying drawings,

FIG. 4b is a diagrammatic horizontal sectional view taken through a three-phase AC electric arc furnace illustrating the split and relocated hot spot areas in a furnace equipped with an external magnetic coil energized with direct current according to the invention;

FIG. 4c is a diagrammatic horizontal sectional view taken through a three-phase AC electric arc furnace illustrating the spread out and weakened hot spot areas in a furnace with an external magnetic coil which is energized with low frequency alternating current according to the invention;

Figure 1:
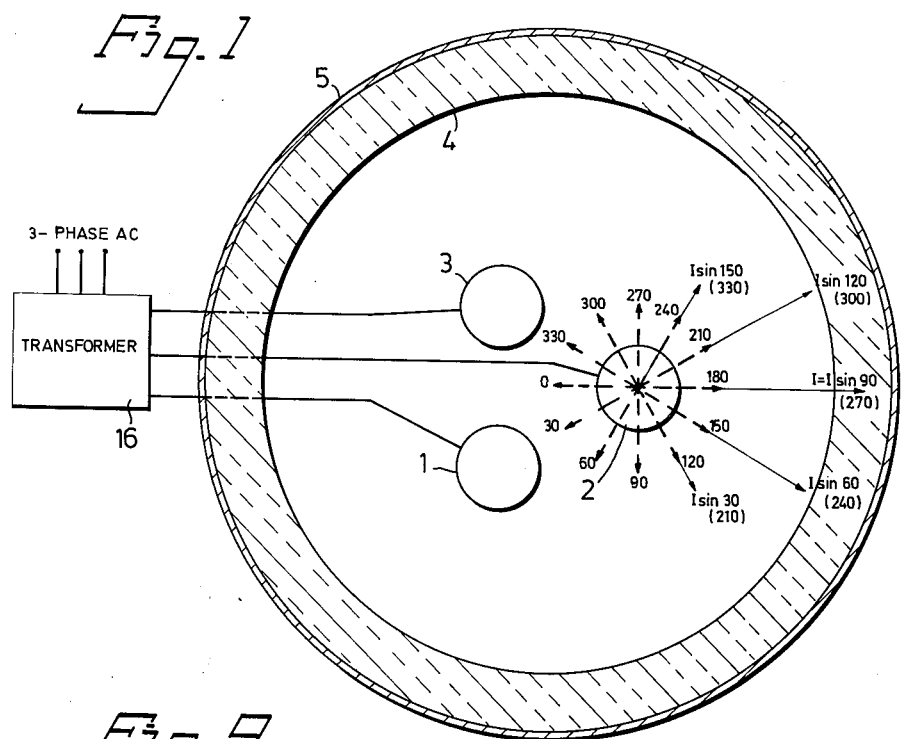
FIG. 1 is a diagrammatic horizontal sectional view taken through a three-phase AC electric arc furnace illustrating the magnetic field at one of the electrodes created by the current in the other two electrodes and the movement of the arc of said one electrode as a result of said magnetic field.

Referring to FIG. 1, the three electrodes of a three-phase AC electric arc furnace are designated 1, 2 and 3. Reference numeral 4 designates the refractory wall lining and 5 the furnace shell which is made of ordinary steel plate. The furnace is powered from a three-phase AC supply via a transformer 16 permitting operation of the furnace at desired current and voltage levels. The dotted vectors illustrate the directions of the magnetic field at electrode 2 during a complete cycle of 360° of the current through this electrode. This rotating magnetic field interacts with the arc current so that the arc is subjected to a force which as may be derived from Biot-Savart's law is the vectorial product of the arc current and the magnetic flux density. During one half cycle, 0°–180°, the arc is forced to move in a way illustrated by the continuous arrows in FIG. 1 where the direction of each arrow corresponds to the direction of the arc and the length of each arrow, measured from the center of electrode 2 to the arrow head, represents the instantaneous value of the arc current. It may be noted that at the instant when the arc current reaches its maximum value, the arc is directed radially out towards the furnace wall causing heavy wear thereof. During the subsequent half cycle, the magnetic field vector as well as the arc current have the reversed direction and thus the same movement of the arc will be repeated during both positive and negative half cycles of the arc current.

Figure 2:
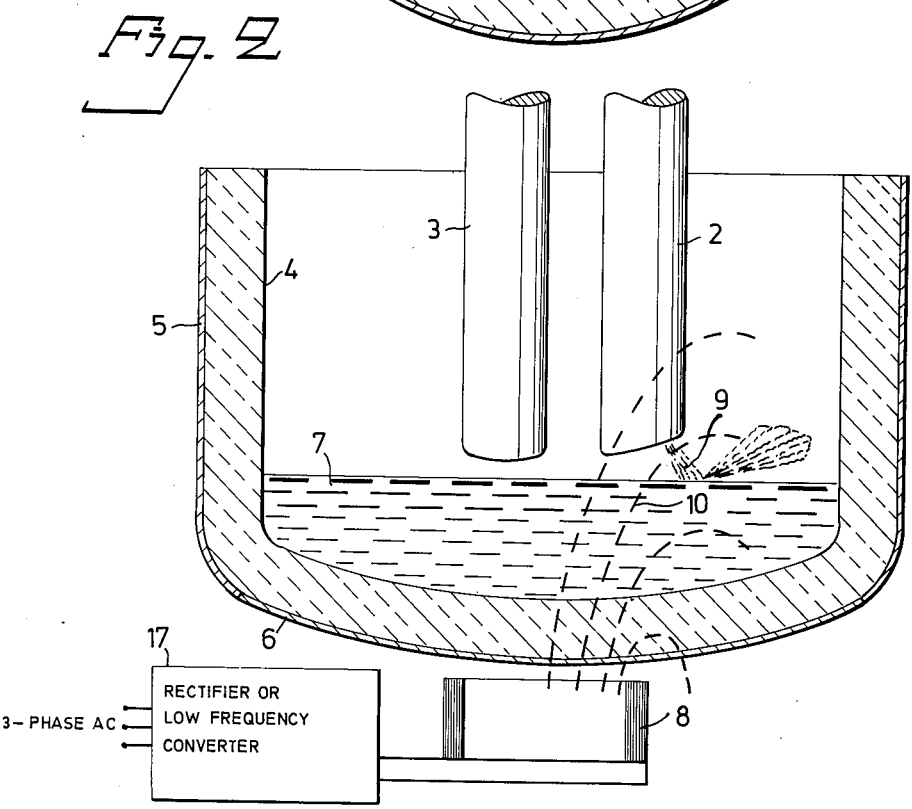
FIG. 2 is a diagrammatic partial vertical sectional view taken through a three-phase electric arc furnace including an apparatus in accordance with the present invention.
Figure 3:
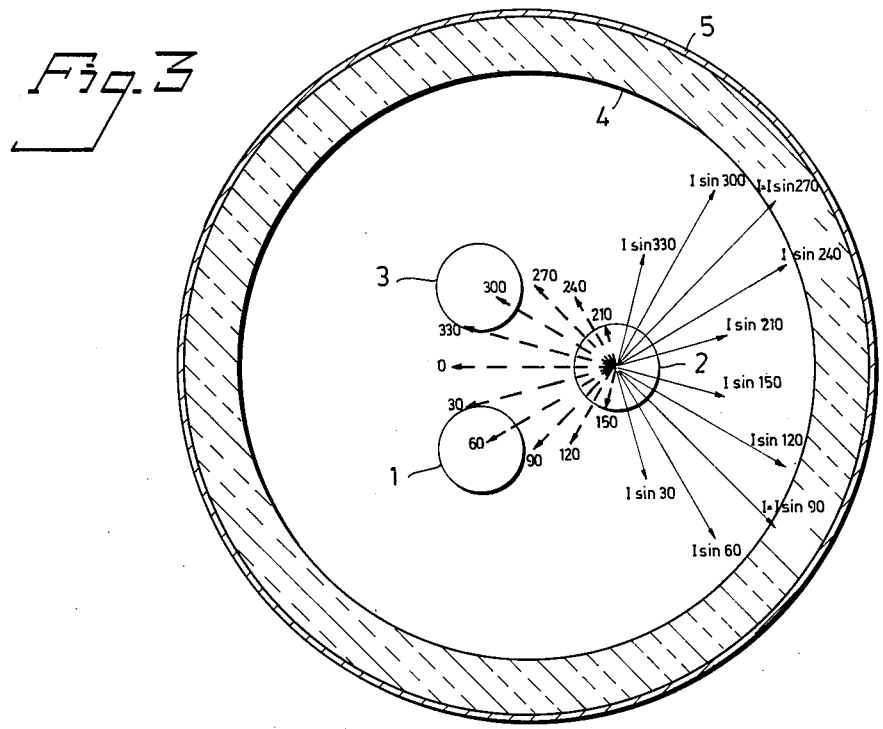
FIG. 3 is a diagrammatic horizontal sectional view taken through the furnace of FIG. 2 illustrating the magnetic field at one of the electrodes created by the currents in the other two electrodes and by the apparatus according to the invention and the movement of the arc of said one electrode as a result of the combined magnetic field.

FIGS. 2 and 3 show a three-phase AC electric arc furnace similar to the furnace of FIG. 1 but provided with an electro-magnetic coil 8 under the furnace bottom 6, the shell of which is made of a non-magnetic material. 7 designates the melt and 9 the arc from the electrode 2. The magnetic field from the coil 8 has been indicated by the dotted lines 10. The coil 8 is powered from a three-phase AC supply via a preferably variable rectifier or low frequency converter 17 of e.g. well-known type and permitting varying the strength or frequency and strength of the magnetizing current.

The total magnetic field influencing the arc 9 is composed by a stationary or quasi-stationary magnetic field 10 originating from the coil 8 and a rotating magnetic field originating from the currents in the electrodes 1 and 3, the latter field being discussed with reference to FIG. 1.

If, as an example, the magnetic field originating from the coil has the same strength as the rotating field originating from the electrodes 1 and 3, the total resulting magnetic field may be represented by a rotating field vector, the size and direction of which varies as illustrated by the dotted field vectors in FIG. 3 as the alternating current in electrode 2 goes through one complete cycle of 360°. This resulting magnetic field will obviously steer the arc towards different positions of the furnace wall during the positive and the negative half cycle of the arc current. More specifically, at the instants when the arc current reaches its maximum positive and negative value, the arc will be displaced ± 45° from the position it would have in a furnace without the external electromagnetic coil 8 or with said coil unenergized. The result is that the wall wear which is caused by the arc will now be distributed over six zones of the furnace wall rather than three as experienced in a furnace without a magnetic coil 8.

Figure 4A:
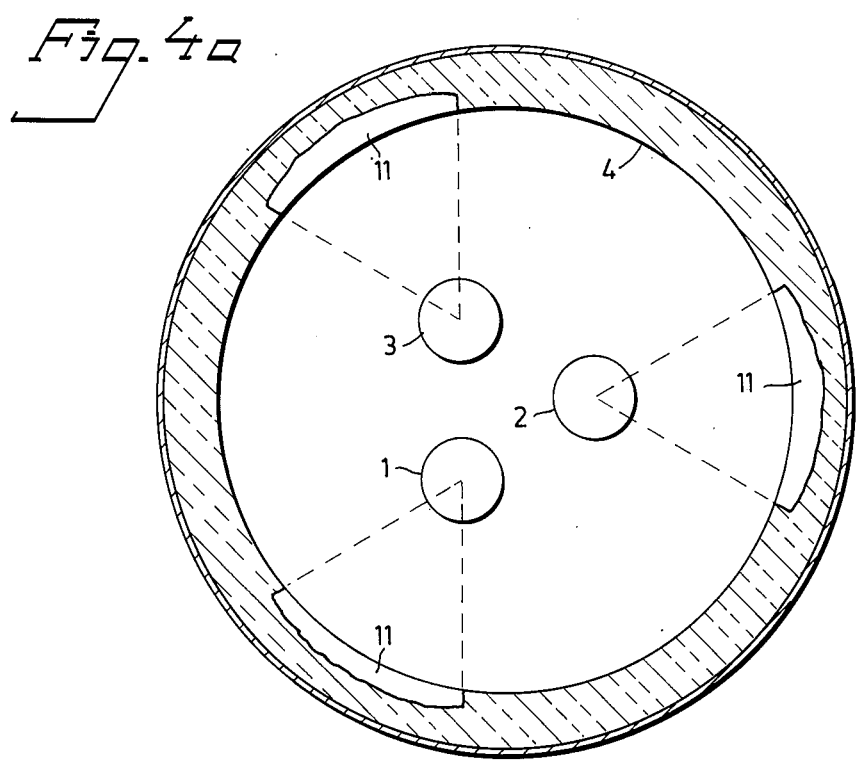
FIG. 4a is a diagrammatic horizontal sectional view taken through a conventional three-phase AC electric arc furnace illustrating the hot spot areas of the furnace wall lining.

This is further illustrated by the FIGS. 4. In FIG. 4a has been indicated the three hot spot areas 11 in a furnace without a magnetic coil according to the invention or with such coil which is not energized. In FIG. 4b is indicated six hot spot areas which are shown located outside the normal three hot spot areas and which would result with a magnetic coil, energized as previously described. It is then also obvious that if the coil is alternately energized and non-energized or energized with variable force such as would be the case if the coil is supplied with a low frequency alternating current, then a further distribution of the wall wear would result as illustrated in FIG. 4c where wider but less severe wear zones 13 have been indicated.

If the magnetic field from the coil 8 is made stronger than the field originating from the electrode currents, the arcs will be subjected to correspondingly stronger reorienting forces. If the field from the coil is then also suitably varied, it is possible to approach the ideal situation with the wall wear evenly distributed around the circumference in the furnace. As an example, well distributed wall lining wear may be obtained by any suitably selected or programmed intermittent energization of the coil, including time intervals at various power levels or zero power in the order of minutes, hours, days or even weeks.

An estimation of the required magnetizing force may be arrived at in the following way: Generally, the magnetizing force H at the distance $r$ from an infinitely long conductor carrying the current $i$ is:

$$H = \frac{i}{2\pi r}$$

In an arc furnace the conductors, i.e. the electrodes, have a limited length and it is of interest to know the magnetizing force at the tip of the electrodes, where the arcs burn.

If the electrode pitch diameter is designated $a$, then at electrode 2 the magnetizing force $H_1$ originating from the current in electrode 1 is approximately $$H_1 \approx \frac{i_1}{2\pi a \sqrt{3}}$$

The distance $r$ in this case corresponds to a $\sqrt{3}/2$ and thus $H_1$ is approximately half of the value calculated for an infinitely long conductor.

In a similar way at electrode 2 the magnetizing force $H_3$ originating from the current in electrode 3 may be written:

$$H_3 \approx \frac{i_3}{2\pi a \sqrt{3}}$$

The total field $H_{1+3}$ at electrode 2, originating from the currents in the electrodes 1 and 3 may be arrived at by vectorial addition of $H_1$ and $H_3$, bearing in mind that $i_1$ and $i_3$ are alternating currents with a phase difference of 120°. If the top value of the alternating electrode current is designated I, then $$H_{1,3} \approx \frac{I}{4\pi a}$$

As an example, in a furnace for a charge of 100 tons the electrode pitch diameter can be 1.5 m and the alternating electrode current 50kA, effective value. In this case $H_{1+3}$ will be about 3750A/m corresponding to a magnetic flux density of 50 Gauss.

A magnetic coil mounted under the furnace will be arranged at a distance from the arcs corresponding to the bottom lining thickness and the depth of the steel bath, in the example approximately 1.5 m. A magnetic flux density of 50 Gauss at the arcs would require a coil with a diameter of 1 m and with 200,000 ampere turns, e.g. a winding with 100 turns and supplied with a current of 2,000 A.

A certain direction of the field from the magnetic coil will, as has already been described, deflect the arc in one direction during the negative half cycle of the arc current and in another direction during the positive half cycle. As the wall wear is apt to be dependent also on the direction of the arc current, it would be desirable to reverse the, magnetic field from the coil, e.g. periodically, in order to obtain the best possible distribution of the wall wear. This can be achieved by energizing the coil by a low frequency current and with low frequency should then be understood a frequency considerably lower than the frequency of the arc current and preferably lower than 25 Hz and e.g. even lower than 1 Hz.

It has already been mentioned that the furnace bottom shell should be made of a non-magnetic material, e.g. stainless steel, so as to facilitate the passage of the magnetic flux from the coil through the bottom. It is, however, not necessary that the entire bottom shell is non-magnetic, in fact only the portion immediately over and adjacent to the coil need to be non-magnetic. As an example, the diameter of the non-magnetic portion of the furnace bottom shell could be twice or three times the diameter of the coil. It is also possible to place the coil between the furnace bottom shell and the furnace bottom lining, in which case the entire furnace bottom shell may consist of a magnetic material.

In order to increase the magnetic field strength from the coil in the area of the arcs, the coil may be provided with an iron core which entirely or partly fills the space inside the coil. In addition, the coil suspension arrangement can be made to serve the additional purpose of an external magnetic yoke device and also the magnetic portion of the furnace bottom and shell may then be part of the magnetic circuit to boost the strength of the magnetic field from the coil at the arcs.

Figure 5:
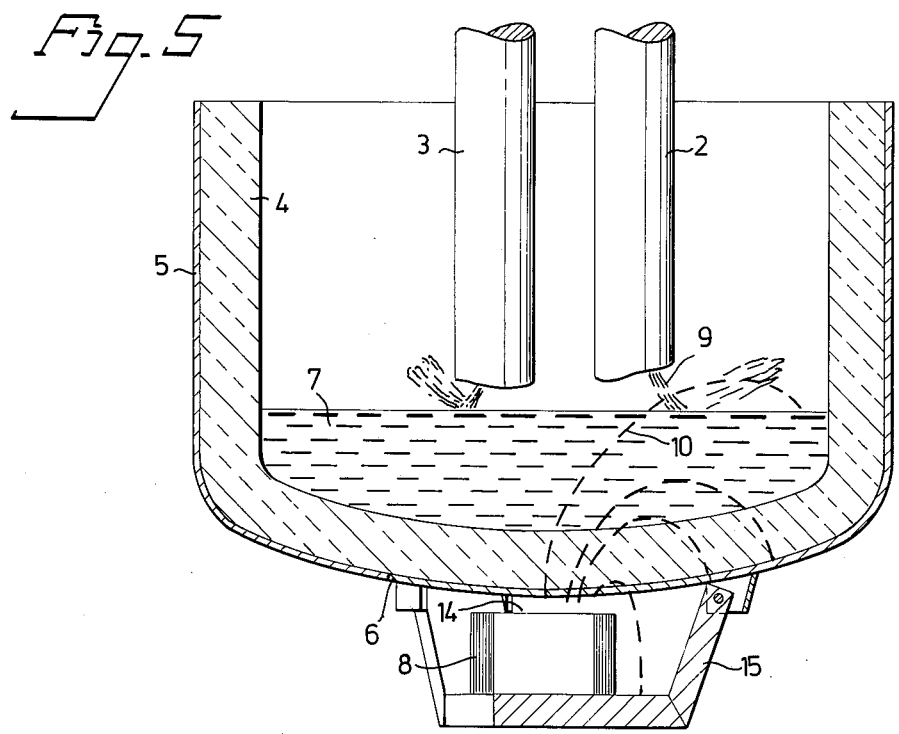
FIG. 5 is a diagrammatic partial vertical sectional view taken through a three-phase electric arc furnace with a magnetic coil and a suspension arrangement which together with a magnetic portion of the furnace shell forms a part of the magnetic circuit in order to increase the strength of the magnetic field at the arcs.
Figure 6:
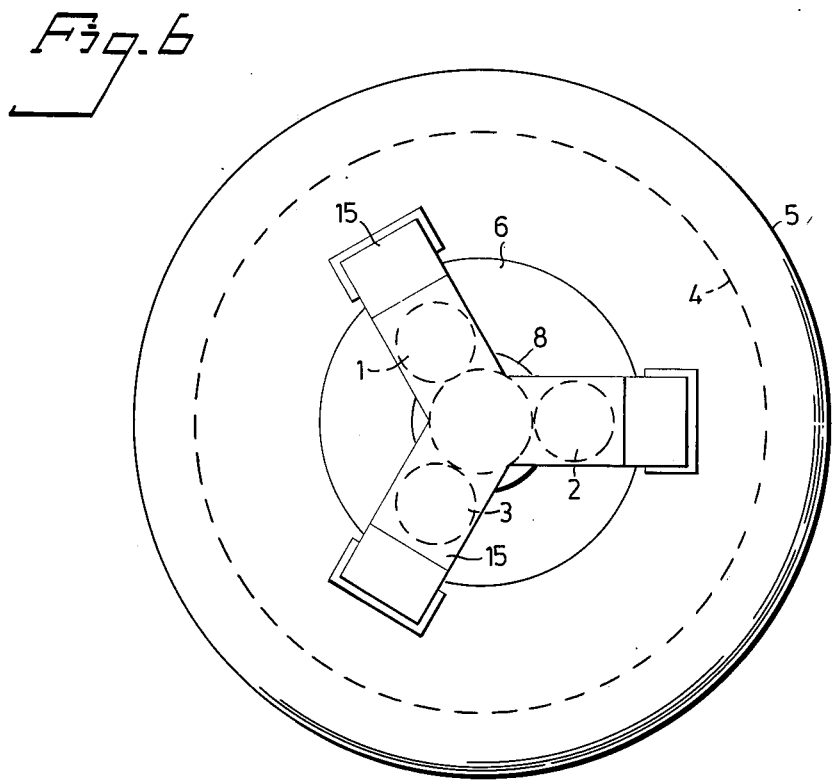
FIG. 6 is a diagrammatic view from below of the arrangement according to FIG. 5.

This is illustrated in FIGS. 5 and 6 where only a small portion 6 of the bottom shell is non-magnetic. Reference numeral 14 designates an iron core in the coil 8 and 15 suspension beams which consist of magnetic material and thus also serve as external yokes to the magnetic flux. To some extent also the magnetic furnace wall shell and peripheral bottom shell portion 5 serve as such yoke means. The suspension beams may be placed straight under the electrodes in order to boost the magnetic field mainly in the area of the arcs.

This suspension arrangement is shown as an example, but other arrangement of magnetic yokes, cores and coils are possible within the scope of the invention in order to influence the distribution and direction of the magnetic flux inside the furnace. As an example, coils may also be placed around the three beams 15. Another practical arrangement is to use a pancake type coil supported by a plurality of radially oriented magnetic yokes. Several other variations are possible within the scope of the invention as defined in the following patent claims.

I claim:

1. A method of equalizing the wear of the wall lining in a three-phase AC electric arc furnace by using a magnetic field arranged substantially symmetrically to the electrodes and intersecting the arcs in the furnace space above the charge, the method comprising passing said magnetic field to the furnace space through the furnace bottom lining and the furnace charge, and maintaining the polarity of the magnetic field unchanged during a period of time substantially exceeding the time period of one complete cycle of the electrode supply current thereby deflecting the arcs alternatingly towards both sides of the arc directions resulting solely from the magnetic fields created by the currents passing through the electrodes.

2. A method according to claim 1, comprising keeping the polarity of the magnetic field intersecting the arcs constant.

3. A method according to claim 1, comprising reversing the polarity of the magnetic field intersecting the arcs periodically with a frequency less than half the frequency of the electrode supply current.

4. A method according to any of claim 1, comprising varying the strength of the magnetic field intersecting the arcs.

5. An apparatus for equalizing the wear of the wall lining in a three-phase AC electric arc furnace, including means for creating a magnetic field arranged substantially symmetrically to the electrodes and intersecting the arcs in the furnace space above the charge, the apparatus comprising at least one electromagnetic coil mounted under the furnace bottom lining and means for supplying an electric current to said coil of a polarity which is unchanged during a period of time substantially exceeding the time period of one complete cycle of the electrode supply current.

6. An apparatus according to claim 5, comprising means for supplying DC current to said coil.

7. An apparatus according to claim 5, comprising means for supplying AC current to said coil of a frequency less than half the frequency of the electrode supply current.

8. An apparatus according to claim 5, comprising means for varying the strength of the current supplied to said coil.

9. An apparatus according to any of claim 5, wherein said coil is arranged outside the furnace bottom beneath a non-magnetic shell portion thereof.

10. An apparatus according to any of claim 5, wherein said coil is provided with a core or yoke means of magnetic material in order to increase the strength of the magnetic field inside the furnace.

11. An apparatus according to claim 10, wherein a coil suspension arrangement forms a core or yoke means in the magnetic circuit.

* * * * *

UNITED STATES PATENT AND TRADEMARK OFFICE
CERTIFICATE OF CORRECTION

PATENT NO. : 4,034,146
DATED : July 5, 1977
INVENTOR(S) : Sven-Einar Stenkvist

It is certified that error appears in the above-identified patent and that said Letters Patent are hereby corrected as shown below:

On the Title page, under [30] Foreign Application Priority Data, change "Jan. 28, 1975" to -- Jan. 27, 1975 --.

Signed and Sealed this

*Nineteenth* Day of *June 1979*

[SEAL]

Attest:

RUTH C. MASON
*Attesting Officer*

DONALD W. BANNER
*Commissioner of Patents and Trademarks*